US012636813B2

(12) United States Patent
Liu et al.

(10) Patent No.: US 12,636,813 B2
(45) Date of Patent: May 26, 2026

(54) REMOVAL-FACILITATED ANCHOR SEALING DEVICE FOR BOX GIRDER CONSTRUCTION

(71) Applicant: Yantai University, Yantai (CN)

(72) Inventors: Bo Liu, Yantai (CN); Peizhi Gong, Yantai (CN); Zhenyang Huang, Yantai (CN); Ruixi Yuan, Yantai (CN); Xinyu Wang, Yantai (CN); Yaohang Song, Yantai (CN)

(73) Assignee: Yantai University, Yantai (CN)

( * ) Notice: Subject to any disclaimer, the term of this patent is extended or adjusted under 35 U.S.C. 154(b) by 527 days.

(21) Appl. No.: 18/236,344

(22) Filed: Aug. 21, 2023

(65) Prior Publication Data

US 2024/0181675 A1 Jun. 6, 2024

(30) Foreign Application Priority Data

Dec. 2, 2022 (CN) ......................... 202211542590.1

(51) Int. Cl.

| | |
|---|---|
| ***B28B 7/24*** | (2006.01) |
| ***B28B 23/04*** | (2006.01) |
| ***E01D 2/04*** | (2006.01) |
| *E01D 101/28* | (2006.01) |

(52) U.S. Cl.

CPC ................ *B28B 7/24* (2013.01); *B28B 23/04* (2013.01); *E01D 2/04* (2013.01); *E01D 2101/28* (2013.01)

(58) Field of Classification Search

CPC .. B28B 7/24; B28B 23/04; B28B 3/06; B28B 19/00; B28B 23/046; B28B 23/06; E01D 2/04; E01D 2101/28

See application file for complete search history.

(56) References Cited

U.S. PATENT DOCUMENTS

| | | | | |
|---|---|---|---|---|
| 2,134,865 A * | 11/1938 | Essery | B67D 7/04 | 312/334.44 |
| 3,972,450 A * | 8/1976 | Walters | B65D 1/20 | 220/675 |
| 8,505,780 B2 * | 8/2013 | Oren | B65D 25/08 | 220/601 |

(Continued)

FOREIGN PATENT DOCUMENTS

| | | | | |
|---|---|---|---|---|
| CN | 105946686 A * | 9/2016 | B60P 1/02 | |
| CN | 207775703 U * | 8/2018 | | |

(Continued)

*Primary Examiner* — Bob Zadeh

(74) *Attorney, Agent, or Firm* — Kory D. Christensen

(57) ABSTRACT

A removal-facilitated anchor sealing device for box girder construction is provided and includes a base; wheels are mounted below the base; a forward direction of the wheels is designated as a front side; a main box body is arranged on a top surface of the base in a manner of sliding back and forth; an interior of the main box body is divided into anchor sealing chambers from bottom to top through separation plates; a front side of each anchor sealing chamber is opened; anchor sealing units are arranged in the anchor sealing chamber in sequence in a left-right direction; a spraying unit is arranged below the anchor sealing units; working ends of the anchor sealing units and working end of the spraying unit extend out of the anchor sealing chamber from the front side; a storage unit is arranged on a top surface of the main box body.

8 Claims, 9 Drawing Sheets

(56) References Cited

U.S. PATENT DOCUMENTS

| | | | | |
|---|---|---|---|---|
| 2011/0073615 | A1* | 3/2011 | Anderson | B67D 1/06 222/105 |
| 2024/0181675 | A1* | 6/2024 | Liu | B28B 7/24 |

FOREIGN PATENT DOCUMENTS

| | | | | | |
|---|---|---|---|---|---|
| CN | 108636774 | A | * | 10/2018 | B03C 1/30 |
| CN | 108925245 | A | * | 12/2018 | A01F 11/00 |
| CN | 110589197 | A | * | 12/2019 | B08B 3/10 |
| CN | 212550516 | U | * | 2/2021 | |
| CN | 113102022 | A | * | 7/2021 | B02C 23/10 |
| CN | 216400649 | U | * | 4/2022 | |
| EP | 1857386 | B1 | * | 7/2009 | B65G 53/60 |

* cited by examiner

REMOVAL-FACILITATED ANCHOR SEALING DEVICE FOR BOX GIRDER CONSTRUCTION

CROSS-REFERENCE TO RELATED APPLICATION

This patent application claims the benefit and priority of Chinese Patent Application No. 202211542590.1 filed with the China National Intellectual Property Administration on Dec. 2, 2022, the disclosure of which is incorporated by reference herein in its entirety as part of the present application.

TECHNICAL FIELD

The present disclosure relates to the field of buildings, and specifically to a removal-facilitated anchor sealing device for box girder construction.

BACKGROUND

A box girder is of a concrete structure, which is an important component of a bridge. In order to improve the construction efficiency of bridges, box girders are usually prefabricated first and then lifted onto piers for mounting. A box girder structure includes a bottom plate, a top surface, two side web plates, and wing plates. Prestressed tendons need to be laid in the two side web plates. Corrugated pipes are usually arranged before pouring. The corrugated pipes are fixed together with web plate bodies, and then steel strands are plugged into the corrugated pipes. Both ends of the steel strands are fixed with anchor plates. Prestressed tension is performed on the steel strands. After the tension is completed, the steel strands excessively extending out of two ends are cut off. Finally, a barrel-shaped mold is used to encircle the anchor plates and the steel strands. The mold is filled with concrete slurry. After the concrete is solidified, the mold is removed, and the anchor plates and the steel strands are wrapped and fixed by the columnar concrete. This action is referred to as anchor sealing.

In the prior art, anchor sealing is usually performed manually, and heights of anchor recesses are different, thereby resulting in high labor intensity. Moreover, an axis of each anchor recess is leveled with the ground, thereby making it difficult to fill slurry. After the concrete is solidified, it is also relatively difficult to remove the mold. Therefore, there is an urgent need for an anchor sealing device convenient for filling slurry and removing a mold.

SUMMARY

The present disclosure aims to provide a removal-facilitated anchor sealing device for box girder construction.

The objective of the present disclosure is achieved by the following technical solution. The removal-facilitated anchor sealing device for box girder construction includes a base, wherein wheels are mounted below the base; a side in a forward direction of the wheels is designated as a front side; a main box body is arranged on a top surface of the base in a manner of sliding back and forth; an interior of the main box body is divided into a plurality of anchor sealing chambers from bottom to top through separation plates; for each of the anchor sealing chambers, a front side of the anchor sealing chamber is opened; a plurality of anchor sealing units are arranged in the anchor sealing chamber in sequence in a left-right direction; a corresponding one of spraying units are arranged below the anchor sealing units; working ends of the anchor sealing units and a working end of the corresponding one of the spraying units extend out of the anchor sealing chamber from the front side of the anchor sealing chamber; a storage unit for storing slurry is further arranged on a top surface of the main box body; and a discharging end of the storage unit communicates with the anchor sealing units respectively.

As a preference, each of the spraying units comprises a first box body; the first box body is fixedly connected to an inner bottom surface of a corresponding one of the anchor sealing chambers and is close to the front side of the corresponding one of the anchor sealing chambers; a front side wall of the first box body is fixedly connected with a plurality of sprayer heads that communicate with an interior of the first box body; a top surface of the first box body is rotatably provided with a first rotating shaft; an axis of the first rotating shaft is perpendicular to left and right side walls of the corresponding one of the anchor sealing chambers; the first rotating shaft is provided with a plurality of first threaded sections and a plurality of second threaded sections in sequence in an axial direction thereof; the first threaded sections and the second threaded sections are in one-to-one correspondence to the anchor sealing units: spiral directions of the first threaded sections and spiral directions of the second threaded sections are opposite; the top surface of the first box body is further provided with a first motor; and an output shaft of the first motor is fixedly connected with the first rotating shaft.

As a preference, each of the anchor sealing units comprises a first sliding chute and a second sliding chute; the first sliding chute and the second sliding chute are both located on the top surface of the first box body and are arranged in sequence from left to right; a lengthwise direction of the first sliding chute and a lengthwise direction of the second sliding chute are parallel to the first rotating shaft; the first rotating shaft penetrates through the first sliding chute and the second sliding chute from left to right; one of the first threaded sections is located in the first sliding chute, and one of the second threaded sections is located in the second sliding chute; a first sliding block is mounted in the first sliding chute; the first sliding block sleeves on the first threaded section and is in threaded connection with the first threaded section; a second sliding block is mounted in the second sliding chute; the second sliding block sleeves on the second threaded section and is in threaded connection with the second threaded section; a top surface of the first sliding block is provided with a second motor; an output shaft of the second motor is fixedly connected with a first gear; a top surface of the second sliding block is provided with a third motor; an output shaft of the third motor is fixedly connected with a second gear; and a pipeline assembly is rotatably mounted between the first sliding block and the second sliding block.

As a preference, the pipeline assembly comprises a first cylinder formed by combining a left half cylinder with a right half cylinder; an axis of the first cylinder is parallel to the left and right side walls of the anchor sealing chamber; an outer circumferential wall of the left half cylinder is fixedly connected with a second left half cylinder, and an outer circumferential wall of the right half cylinder is fixedly connected with a second right half cylinder; the second left half cylinder and the second right half cylinder are combined into a second cylinder; the second cylinder communicates with the first cylinder, and an axis of the second cylinder is perpendicular to the first cylinder; a combined surface, which faces towards the right half cylinder, of the left half cylinder is fixedly connected with a clamping block; a combined surface, which faces towards the left half cylinder, of the right half cylinder is fixedly connected with a clamping slot; the clamping block is matched with the clamping slot; the outer circumferential wall of the left half cylinder is fixedly connected with a second rotating shaft; an axis of the second rotating shaft is perpendicular to the left and right side walls of the anchor sealing chamber; the second rotating shaft is rotatably mounted on the first sliding block and is fixedly connected with a third gear; the third gear is engaged with the first gear; the outer circumferential wall of the right half cylinder is fixedly connected with a third rotating shaft; the third rotating shaft is coaxial with the second rotating shaft; the third rotating shaft is rotatably mounted on the second sliding block and is fixedly connected with a fourth gear; the fourth gear is engaged with the second gear; a ring slot is formed in an outer circumferential wall of one end of the first cylinder; a combinable left half ring and a combinable right half ring are rotatably mounted in the ring slot; an end surface of one end of the left half ring which is away from the first cylinder and an end surface of one end of the right half ring which is away from the first cylinder are fixedly connected with a plurality of metal bosses; an end surface of one end of the left half ring which is close to the first cylinder and an end surface of one end of the right half ring which is close to the first cylinder are fixedly connected with a combinable left half tooth ring and a combinable right half tooth ring respectively; a fourth motor is mounted on the outer circumferential wall of the left half cylinder; an output shaft of the fourth motor is fixedly connected with a fifth gear; the fifth gear is engaged with the left half tooth ring and the right half tooth ring; the pipeline assembly further comprises a first telescopic rod; a rear inner wall of the anchor sealing chamber is fixedly connected with a mounting platform; the first telescopic rod is mounted on the mounting platform: expansion and contraction directions of the first telescopic rod are perpendicular to the rear inner wall of the anchor sealing chamber; and a telescopic end of the first telescopic rod directs to the first cylinder and is fixedly connected with a first disk.

As a preference, the storage unit comprises a storage box fixedly connected to the top surface of the main box body: first discharging assemblies in one-to-one correspondence to the anchor sealing units in an uppermost one of the anchor sealing chambers are arranged in the storage box: each of the first discharging assemblies comprises a first turntable; the first turntable is rotatably mounted on an inner bottom surface of the storage box; a bottom surface of the storage box is fixedly connected with a plurality of first pipelines; one end of each of the first pipelines communicates with an interior of the storage box and the one end of a corresponding one of the first pipelines is located at a lower eccentric position of the first turntable; an other end of each of the first pipelines passes through a top wall of the main box body and directs to the second cylinder of each of the plurality of anchor sealing units at the uppermost one of the anchor sealing chambers; a circle center position of a top surface of the first turntable is fixedly connected with a fourth rotating shaft; an axis of the fourth rotating shaft is perpendicular to the first turntable; an outer circumferential wall of the fourth rotating shaft is fixedly connected with a plurality of agitation rods; a top surface of the storage box is further provided with a fifth motor; an output shaft of the fifth motor extends into the storage box and is fixedly connected with the fourth rotating shaft; the bottom surface of the storage box is further fixedly connected with a plurality of second pipelines; the second pipelines has a same number as the anchor sealing units in each of lower ones of the anchor sealing chambers; one end of each of the second pipelines communicates with an interior of the storage box and the one end of a corresponding one of the second pipelines is located at the lower eccentric position of the first turntable; an other end of each of the second pipelines passes through the plurality of separation plates and directs to the second cylinder of each of the plurality of anchor sealing units at the lower ones of the anchor sealing chambers; and a via hole matched with a corresponding one of the first pipelines and a corresponding one of the second pipelines is formed in a top eccentric portion of the first turntable.

As a preference, a third sliding chute is further formed in an inner top wall of each of the anchor sealing chambers; a lengthwise direction of the third sliding chute is perpendicular to the left and right side walls of the anchor sealing chamber and is close to the front side of the anchor sealing chamber; a third threaded rod and a seventh motor are rotatably mounted in the third sliding chute; an axis of the third threaded rod is parallel to the third sliding chute; an output shaft of the seventh motor is fixedly connected to the third threaded rod; a third sliding block is slidably mounted in the third sliding chute; the third sliding block sleeves on the third threaded rod and is in threaded connection with the third threaded rod; a bottom surface of the third sliding block is provided with a second telescopic rod; a telescopic end of the second telescopic rod directs to the front side of the anchor sealing chamber and is fixedly connected with a mounting seat; the mounting seat is provided with a sixth motor; and an output shaft of the sixth motor directs to the front side of the anchor sealing chamber and is fixedly connected with a saw blade.

As a preference, a catching basket is further mounted on an inner bottom surface of the anchor sealing chamber; and the catching basket is located below the first telescopic rod and is taken out from a rear side of the anchor sealing chamber.

As a preference, a bottom surface of the main box body is fixedly connected with a plurality of T-shaped sliding blocks; and the top surface of the base is fixedly connected with sliding rails matched with the T-shaped sliding blocks.

Due to the adoption of the above technical solutions, the present disclosure has the following advantages.

1. According to the present disclosure, during prefabrication of a box girder, several exposed steel strands can be synchronously cut and collected, and anchor sealing is performed on the cut part of each steel strand by using the concrete. During the anchor sealing, concrete slurry is automatically compacted to ensure the strength after solidification of the concrete slurry. After the anchor sealing, a mold is convenient to be removed, and the working efficiency is improved.
2. The first cylinders can be used for collecting the steel strands, and the right half ring and the left half ring on each first cylinder can perform roughening. The first disk cooperates with the closed first cylinder to form a cylindrical cavity. The first cylinder can press and compact the concrete. After the pouring of the concrete into the first cylinder is completed, the first cylinder can be rotated 180° to face the first telescopic rod. The first disk can extend into the first cylinder and scrape an inner wall of the first cylinder in a reciprocating manner to clear concrete residues, and the concrete residues fall into the catching basket.

Other advantages, objectives, and features of the present disclosure will be explained to some extents in the subsequent specification. Furthermore, to some extents, based on the investigation and research below, it will be clear to those skilled in the art or those skilled in the art can be taught from the practice of the present disclosure. The objectives and other advantages of the present disclosure can be achieved and obtained through the following specification and claims.

BRIEF DESCRIPTION OF THE DRAWINGS

The accompanying drawings of the present disclosure are as follows.

Figure 1:
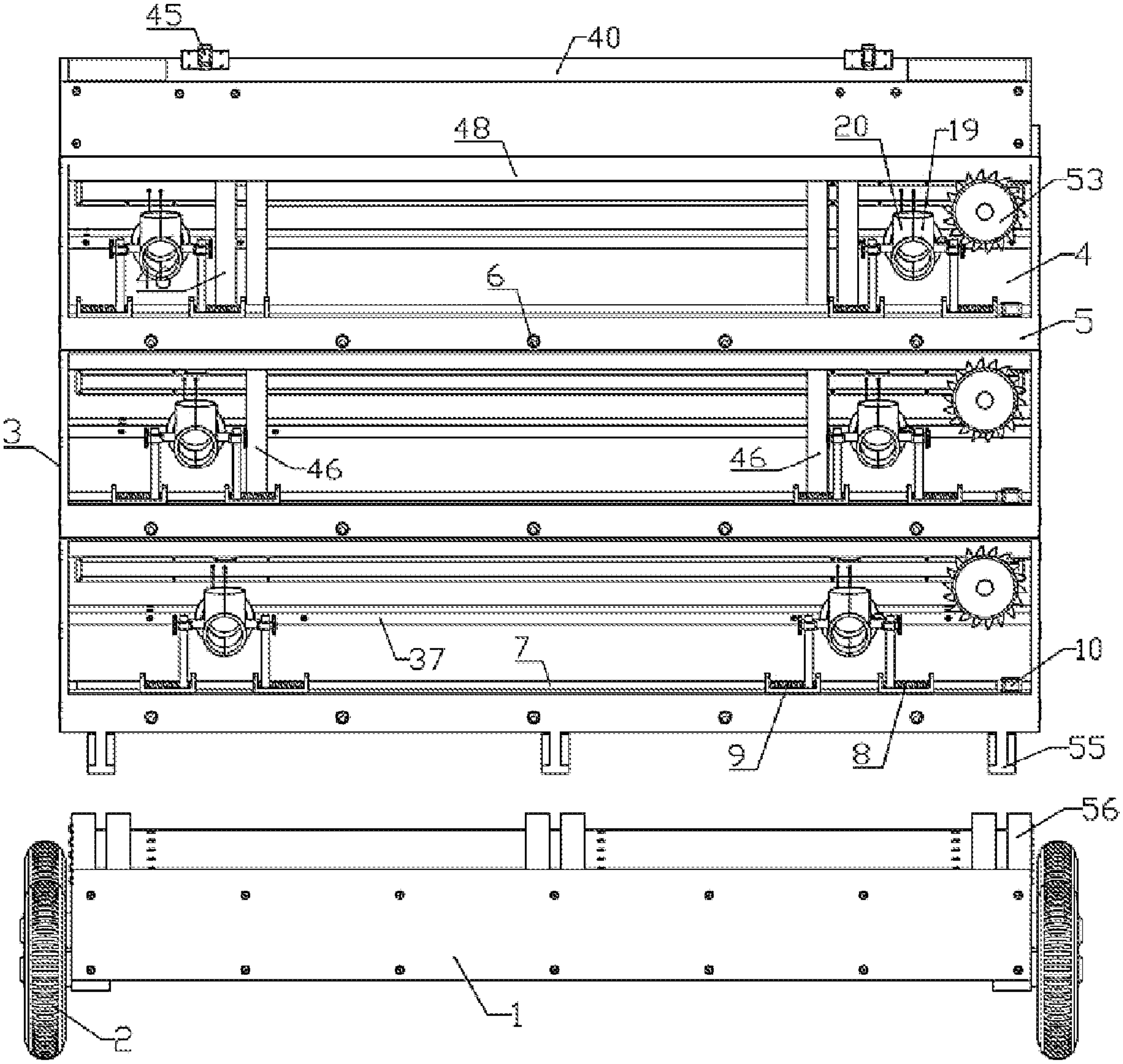
FIG. 1 is a front schematic diagram of a removal-facilitated anchor sealing device for box girder construction according to some embodiments of the present disclosure.

In the drawings: 1: base; 2: wheel; 3: main box body; 4; anchor sealing chamber; 5: first box body; 6: sprayer head; 7: first rotating shaft; 8: first threaded section; 9: second threaded section; 10: first motor; 11: first sliding chute; 12: second sliding chute; 13: first sliding block; 14: second sliding block; 15: second motor; 16: first gear; 17: third motor; 18: second gear; 19: left half cylinder; 20: right half cylinder; 21: second left half cylinder; 22: second right half cylinder; 23: clamping block; 24: clamping slot; 25: second rotating shaft; 26: third gear; 27: third rotating shaft; 28: fourth gear; 29: ring slot; 30: left half ring; 31: right half ring; 32: metal boss; 33: left half tooth ring; 34: right half tooth ring; 35: fourth motor; 36: fifth gear; 37: mounting platform; 38: first telescopic rod; 39: first disk; 40: storage box; 41: first turntable; 42: first pipeline; 43: fourth rotating shaft; 44: agitation rod; 45: fifth motor; 46: second pipeline; 47: via hole; 48: third sliding chute; 49: third sliding block; 50: second telescopic rod; 51: mounting seat; 52: sixth motor; 53: saw blade; 54: catching basket; 55: T-shaped sliding block; 56: sliding rail; 57: third threaded rod; and 58: seventh motor.

DETAILED DESCRIPTION OF THE EMBODIMENTS

The present disclosure is further described below in combination with the accompanying drawings and embodiments.

In the description of the embodiments of the present disclosure, it should be noted that orientations or positional relationships indicated by the terms “center”, “longitudinal”, “transverse”, “upper”, “lower”, “front”, “rear”, “left”, “right”, “vertical”, “horizontal”, “top”, “bottom”, “inside”, “outside” and the like are orientations or positional relationships as shown in the drawings, and are only for the purpose of facilitating and simplifying the description of the embodiments of the present disclosure instead of indicating or implying that devices or elements indicated must have particular orientations, and be constructed and operated in the particular orientations, so that these terms are construed as limiting the embodiments of the present disclosure. In addition, the terms “first”, “second” and “third” are only for the purpose of description, and may not be understood as indicating or implying the relative importance. In the description of the embodiments of the present disclosure, it should be noted that unless otherwise explicitly defined and defined, the terms “connect” and “connected” are to be understood broadly, and may be, for example, fixedly connected, or detachably connected, or integrally connected, or mechanically connected, or electrically connected, or directly connected, or indirectly connected through an intermediate medium. Those of ordinary skill in the art can understand the specific meanings of the above terms in the present disclosure according to specific situations.

Figure 2:
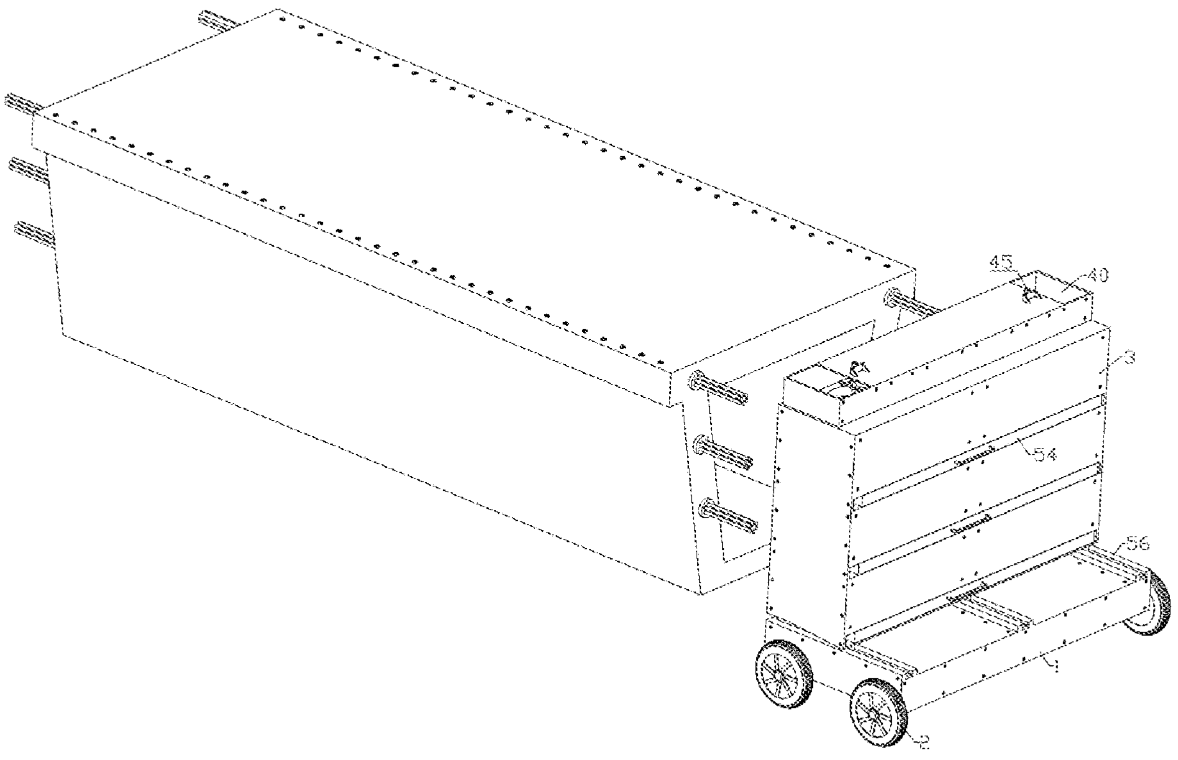
FIG. 2 is a rear schematic diagram of the removal-facilitated anchor sealing device for box girder construction according to some embodiments of the present disclosure.
Figure 3:
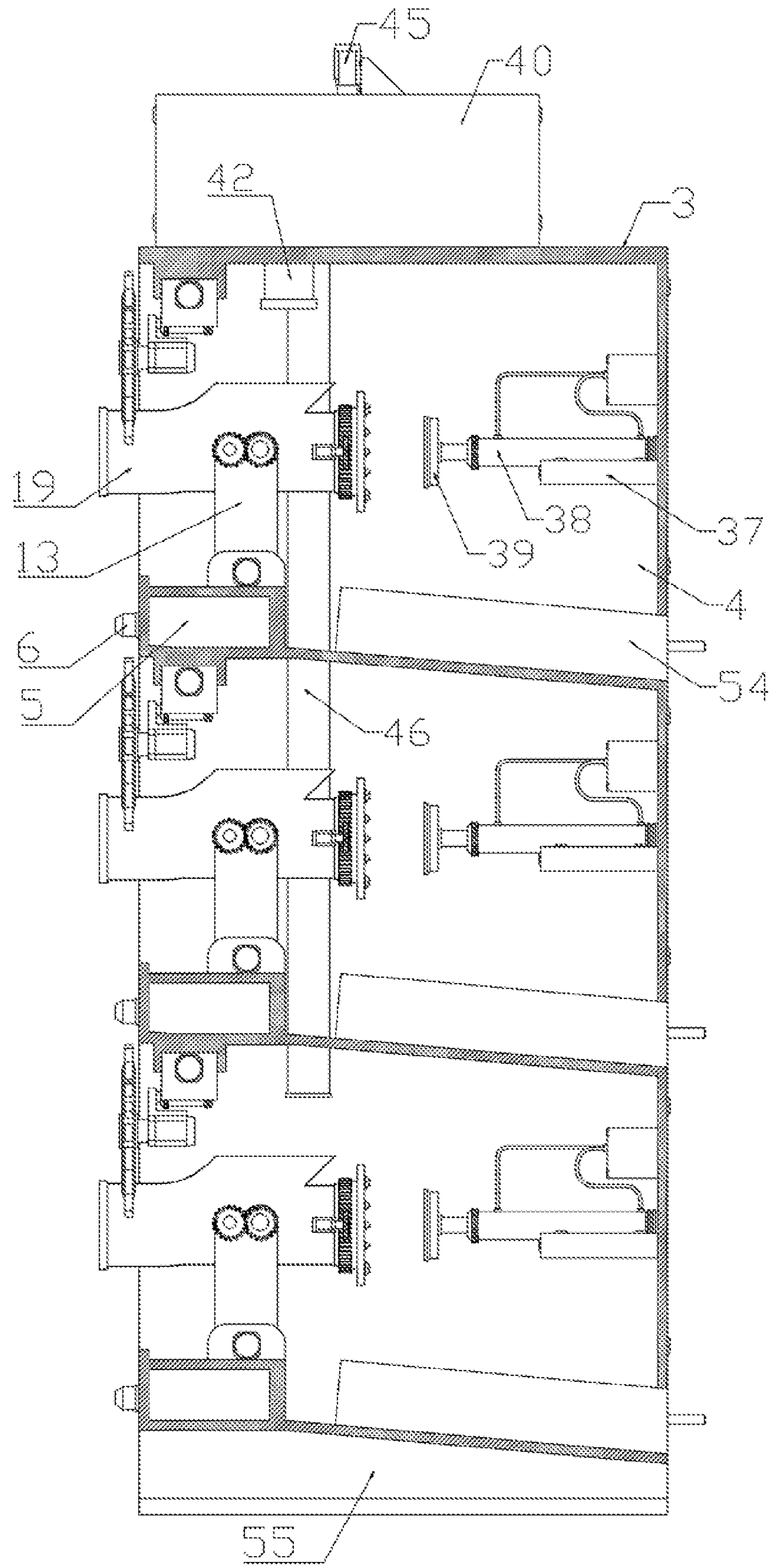
FIG. 3 is a schematic diagram of a main box body according to some embodiments of the present disclosure.

As shown in FIG. 1 to FIG. 3, a removal-facilitated anchor sealing device for box girder construction includes a base 1. Wheels 2 are mounted below the base 1. A side of forward direction of the wheels 2 is designated as a front side. A main box body 3 is arranged on a top surface of the base 1 in a manner of sliding back and forth; an interior of the main box body 3 is divided into several anchor sealing chambers 4 from bottom to top through separation plates.

Front sides of the anchor sealing chambers 4 are all opened: several anchor sealing units are arranged in the anchor sealing chamber 4 in sequence in a left-right direction; spraying units are arranged below the anchor sealing unit: working ends of the anchor sealing units and working ends of the spraying unit extend out of the anchor sealing chamber 4 from the front side of the anchor sealing chamber; a storage unit for storing slurry is further arranged on a top surface of the main box body 3; and a discharging end of the storage unit communicates with the several anchor sealing units respectively.

In this embodiment, a box girder includes and is composed of a bottom plate, a top plate, and two side web plates. Corrugated pipes are arranged inside the two side web plates in an interpenetrating manner during pouring. Steel strands are threaded into the corrugated pipes for prestressed tension respectively. Two ends of each steel strand extend out of the box girder from the respective anchor plate. Excess steel strands are first cut off, and only several centimeters of these steel strands are maintained. Finally, anchor sealing is performed on the anchor plates, that is, the steel strands and the anchor plates are wrapped by concrete slurry to form a columnar shape.

The anchor sealing units extend out to first roughen positions around the anchor plates. The spraying units spray a waterproof coating, and the storage unit pours slurry into the anchor sealing units. The anchor sealing units seal the anchor plates to form a columnar shape.

According to the present disclosure, during prefabrication of a box girder, several exposed steel strands can be synchronously cut and collected, and anchor sealing is performed on the cut part of each steel strand by using the concrete, which improves the working efficiency. In addition, during the anchor sealing, concrete slurry is automatically compacted to ensure the strength after solidification of the concrete slurry.

Figure 4:
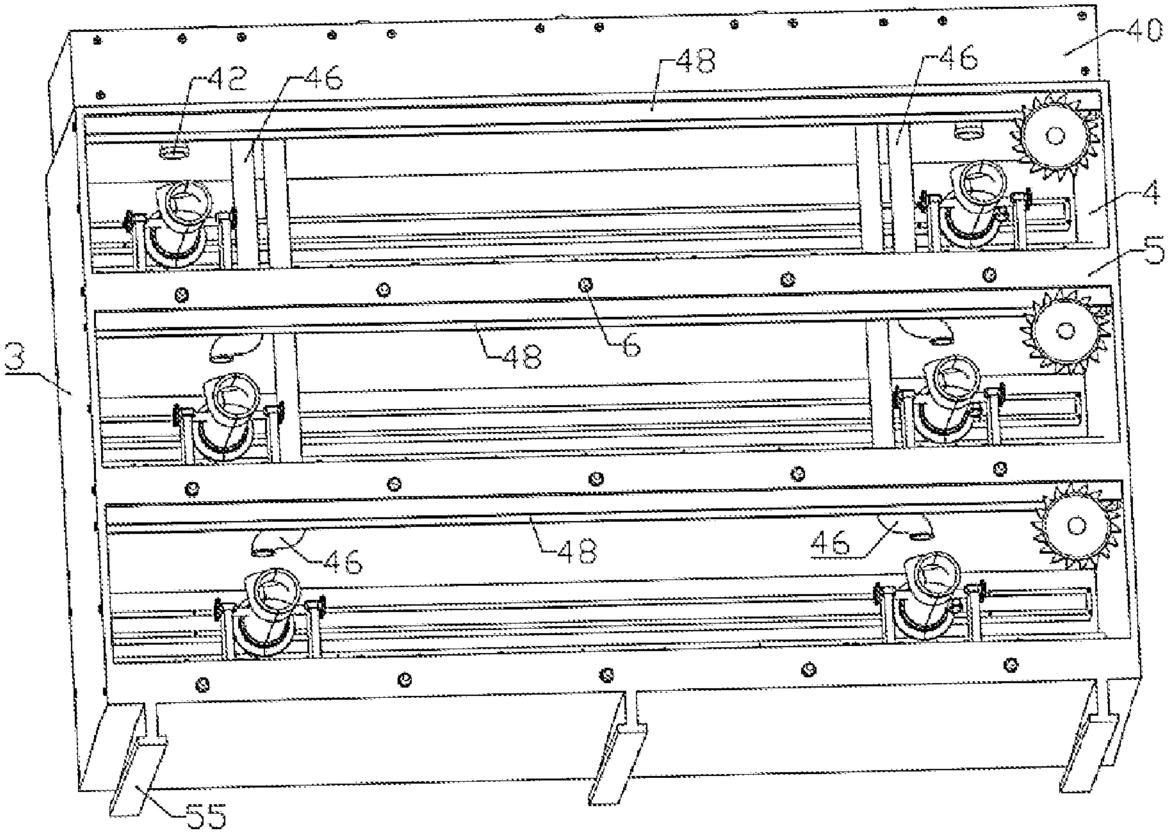
FIG. 4 is a schematic diagram of a third sliding chute according to some embodiments of the present disclosure.
Figure 5:
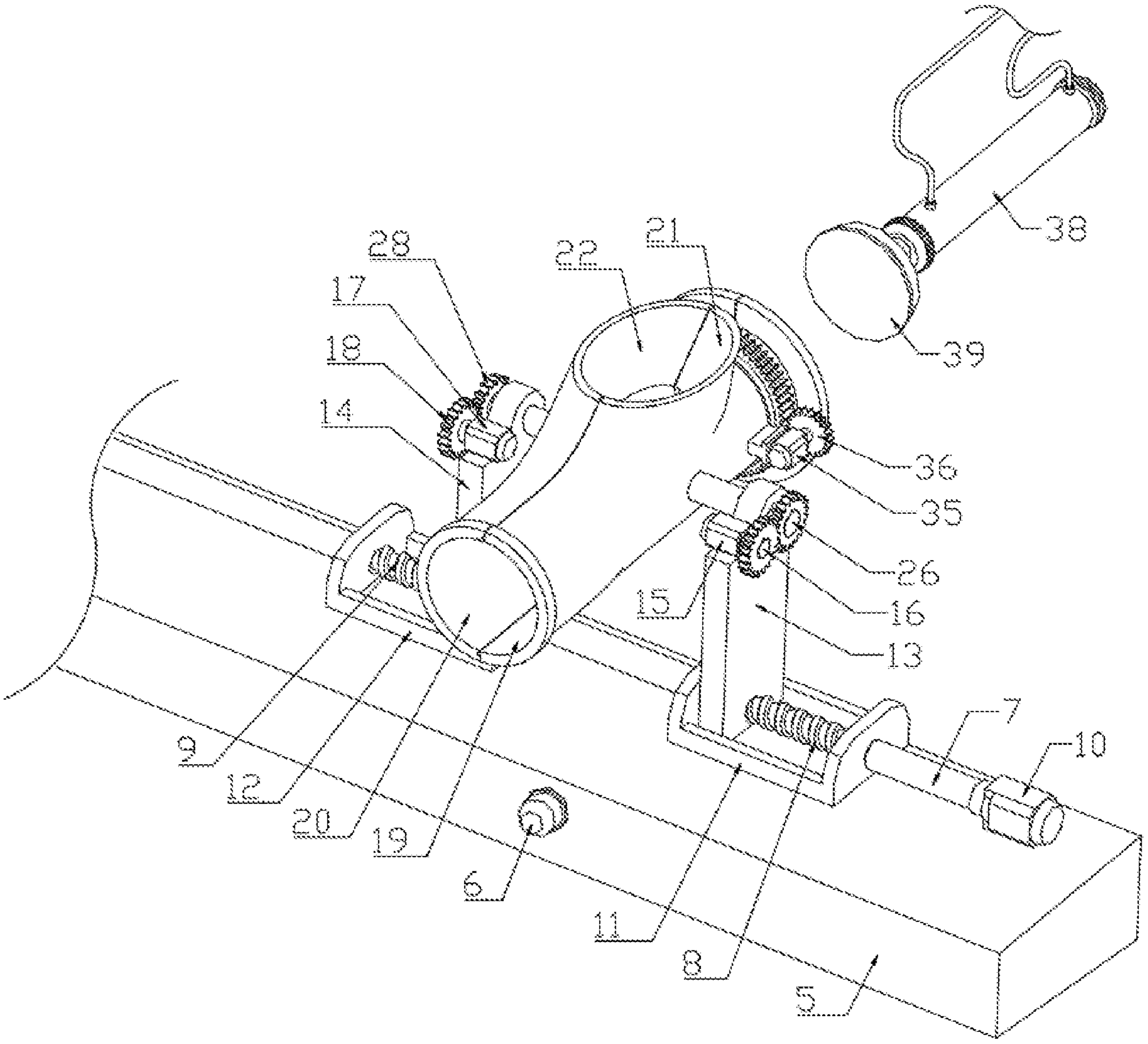
FIG. 5 is a schematic diagram of an anchor sealing unit according to some embodiments of the present disclosure.

As shown in FIG. 3 to FIG. 5, each of the spraying units includes a first box body 5; the first box body 5 is fixedly connected to an inner bottom surface of the anchor sealing chamber 4 and is close to the front side of the anchor sealing chamber 4; and a front side wall of the first box body 5 is fixedly connected with several sprayer heads 6 that communicates with an interior of the first box body 5.

A top surface of the first box body 5 is rotatably provided with a first rotating shaft 7; an axis of the first rotating shaft 7 is perpendicular to left and right side walls of the anchor sealing chamber 4; the first rotating shaft 7 is provided with several first threaded sections 8 and several second threaded sections 9 in sequence in an axial direction thereof; the first threaded sections 8 and the second threaded sections 9 are in one-to-one correspondence to the anchor sealing units; spiral directions of the first threaded sections 8 and spiral directions of the second threaded sections 9 are opposite; the top surface of the first box body 5 is further provided with a first motor 10; and an output shaft of the first motor 10 is fixedly connected with the first rotating shaft 7.

In this embodiment, the waterproof coating can be stored in the first box body. The sprayer heads are aligned with the respective steel strands. Waterproofing work is performed on the steel strands before anchor sealing. Clean water can also be stored to clean the anchor plates and the steel strands.

The first motor drives the first rotating shaft to rotate, and the first rotating shaft drives the first threaded sections and the second threaded sections to rotate.

As shown in FIG. 1 and FIG. 5, each of the anchor sealing units includes a first sliding chute 11 and a second sliding chute 12; the first sliding chute 11 and the second sliding chute 12 are both located on the top surface of the first box body 5 and are arranged in sequence from left to right; a lengthwise direction of the first sliding chute 11 and a lengthwise direction of the second sliding chute 12 are parallel to the first rotating shaft 7; the first rotating shaft 7 penetrates through the first sliding chute 11 and the second sliding chute 12 from left to right; and the first threaded section 8 is located in the first sliding chute 11, and the second threaded section 9 is located in the second sliding chute 12.

A first sliding block 13 is mounted in the first sliding chute 11; the first sliding block 13 sleeves on the first threaded section 8 and is in threaded connection with the first threaded section 8; a second sliding block 14 is mounted in the second sliding chute 12; the second sliding block 14 sleeves on the second threaded section 9 and is in threaded connection with the second threaded section 9; a top surface of the first sliding block 13 is provided with a second motor 15; an output shaft of the second motor 15 is fixedly connected with a first gear 16; a top surface of the second sliding block 14 is provided with a third motor 17; an output shaft of the third motor 17 is fixedly connected with a second gear 18; and a pipeline assembly is rotatably mounted between the first sliding block 13 and the second sliding block 14.

In this embodiment, when the first motor rotates, the first rotating shaft drives the first threaded sections and the second threaded sections to rotate, and the first threaded sections and the second threaded sections drive the first sliding block and the second sliding block to be separated and closed. The first sliding block and the second sliding block drive the pipeline assembly to be separated and closed. The second motor and the third motor drive the pipeline assembly to rotate.

Figure 6:
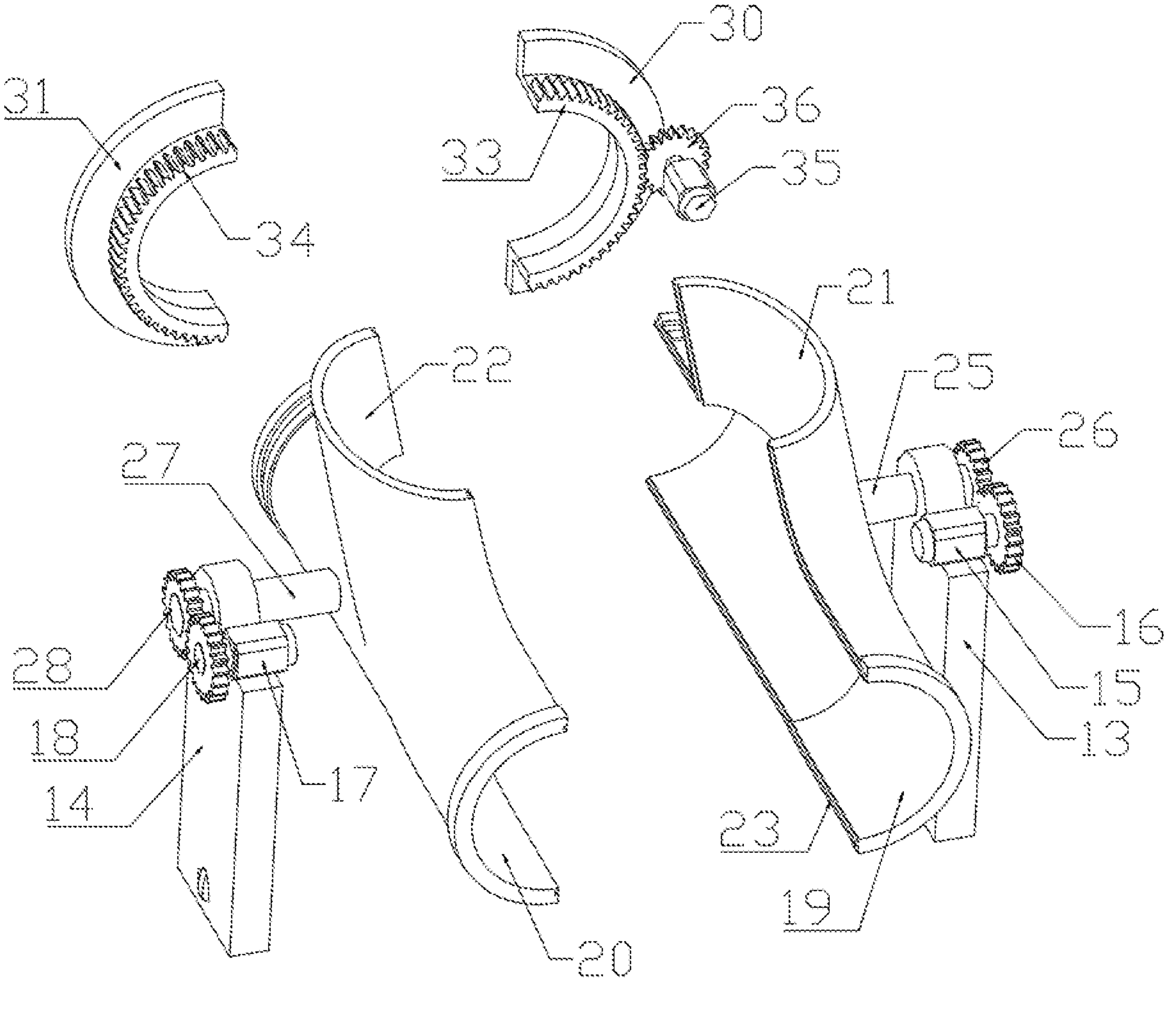
FIG. 6 is a schematic diagram of a pipeline assembly according to some embodiments of the present disclosure.
Figure 7:
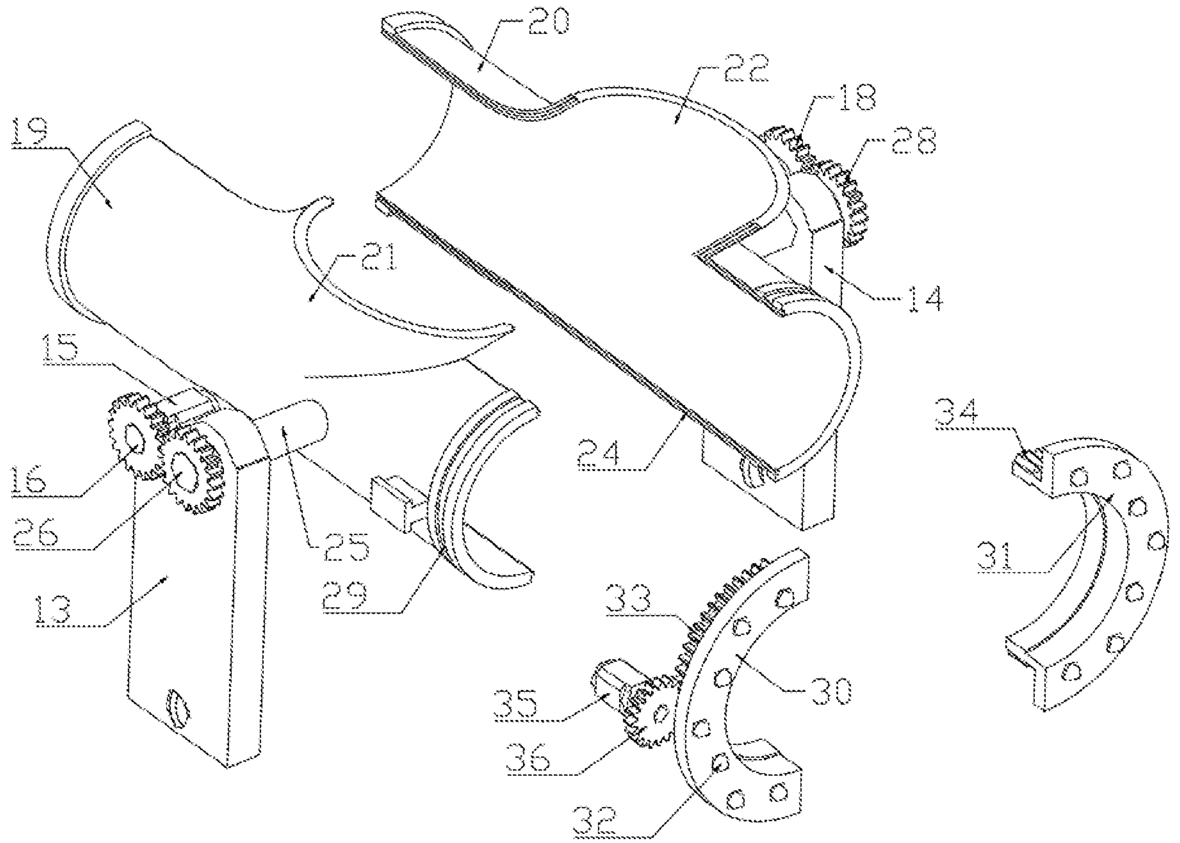
FIG. 7 is a schematic diagram of metal bosses according to some embodiments of the present disclosure.

As shown in FIG. 5 to FIG. 7, the pipeline assembly includes a first cylinder formed by combining a left half cylinder 19 with a right half cylinder 20; an axis of the first cylinder is parallel to the left and right side walls of the anchor sealing chamber 4; an outer circumferential wall of the left half cylinder 19 is fixedly connected with a second left half cylinder 21, and an outer circumferential wall of the right half cylinder 20 is fixedly connected with a second right half cylinder 22; the second left half cylinder 21 and the second right half cylinder 22 are combined into a second cylinder; the second cylinder communicates with the first cylinder, and an axis of the second cylinder is perpendicular to the first cylinder; a combined surface, which faces towards the right half cylinder 20, of the left half cylinder 19 is fixedly connected with a clamping block 23; a combined surface, which faces towards the left half cylinder 19, of the right half cylinder 20 is fixedly connected with a clamping slot 24; the clamping block 23 is matched with the clamping slot 24; the outer circumferential wall of the left half cylinder 19 is fixedly connected with a second rotating shaft 25; an axis of the second rotating shaft 25 is perpendicular to the left and right side walls of the anchor sealing chamber 4; the second rotating shaft 25 is rotatably mounted on the first sliding block 13 and is fixedly connected with a third gear 26; the third gear 26 is engaged with the first gear 16; the outer circumferential wall of the right half cylinder 20 is fixedly connected with a third rotating shaft 27; the third rotating shaft 27 is coaxial with the second rotating shaft 25; the third rotating shaft 27 is rotatably mounted on the second sliding block 14 and is fixedly connected with a fourth gear 28; and the fourth gear 28 is engaged with the second gear 18.

A ring slot 29 is formed in an outer circumferential wall of one end of the first cylinder; a combinable left half ring 30 and a combinable right half ring 31 are rotatably mounted in the ring slot 29; an end surface of one end of the left half ring 30 which is away from the first cylinder and an end surface of one end of the right half ring 31 which is away from the first cylinder are fixedly connected with several metal bosses 32; an end surface of one end of the left half ring 30 which is close to the first cylinder and an end surface of one end of the right half ring 31 which is close to the first cylinder are fixedly connected with a combinable left half tooth ring 33 and a combinable right half tooth ring 34 respectively; a fourth motor 35 is mounted on the outer circumferential wall of the left half cylinder 19; an output shaft of the fourth motor 35 is fixedly connected with a fifth gear 36; and the fifth gear 36 is engaged with the left half tooth ring 33 and the right half tooth ring 34.

The pipeline assembly further includes a first telescopic rod 38; a rear inner wall of the anchor sealing chamber 4 is fixedly connected with a mounting platform 37; the first telescopic rod 38 is mounted on the mounting platform 37; an expansion and contraction direction of the first telescopic rod 38 is perpendicular to the rear inner wall of the anchor sealing chamber 4; and a telescopic end of the first telescopic rod 38 directs to the first cylinder and is fixedly connected with a first disk 39.

In this embodiment, when anchor sealing is required, the second motor drives the left half cylinder to rotate through the third gear and the first gear, and the third motor drives the right half cylinder to rotate through the fourth gear and the second gear. The first cylinder rotates to the end with the left half ring and the right half ring and faces the front side and the anchor plates. In this case, the second cylinder faces down and will not work. The main box body slides forwards. The first cylinder gets close to the box girder to encircle most of the steel strands. A saw blade extends out to cut off excess steel strands. The steel strands fall into the first cylinder, drop out from a rear side of the first cylinder, and fall into a catching basket.

The main box body then continues to slide forwards until the metal bosses on the left half ring and the right half ring abut against end surfaces of the box girder. The fourth motor is started to drive the left half tooth ring and the right half tooth ring to rotate. The metal bosses on the left half ring and the right half ring rotate to roughen the end surfaces of the box girder, which is convenient for the firm binding between new concrete and old concrete.

After the roughening is completed, the main box body slides backwards, and the second motor and the third motor drive the first cylinder to rotate to the other side to face the front side. In this case, the second cylinder faces up and is located below the discharging end of the storage unit. The main box body slides forwards, and the first cylinder abuts against the box girder. The storage unit releases the slurry, and the slurry flows into the first cylinder via the second cylinder. The first telescopic rod extends out to drive the first disk to extend into the first cylinder. The first disk avoids the slurry from leaking out of the other side, and presses forwards and compacts the concrete, so that the concrete is formed into a concrete column. After the pouring of the concrete is completed, the left half cylinder and the right half cylinder are separated, and the first disk is withdrawn, so that the pipeline assembly is separated from the concrete column more easily. The combined surfaces of the left half ring and the right half ring are rotated to an angle that is consistent with an angle of the combined surfaces of the left half cylinder and the right half cylinder, which will not affect the opening of both the left half cylinder and the right half cylinder.

The first cylinder can be used for catching the steel strands, and the right half ring and left half ring on the first cylinder can perform roughening. The first disk cooperates with the closed first cylinder to press and compact the concrete. After the pouring of the concrete into the first cylinder is completed, the first cylinder can be rotated by 180° to face the first telescopic rod. The first disk can extend into the first cylinder and scrape an inner wall of the first cylinder in a reciprocating manner to clear concrete residues, and the concrete residues fall into the catching basket.

Figure 8:
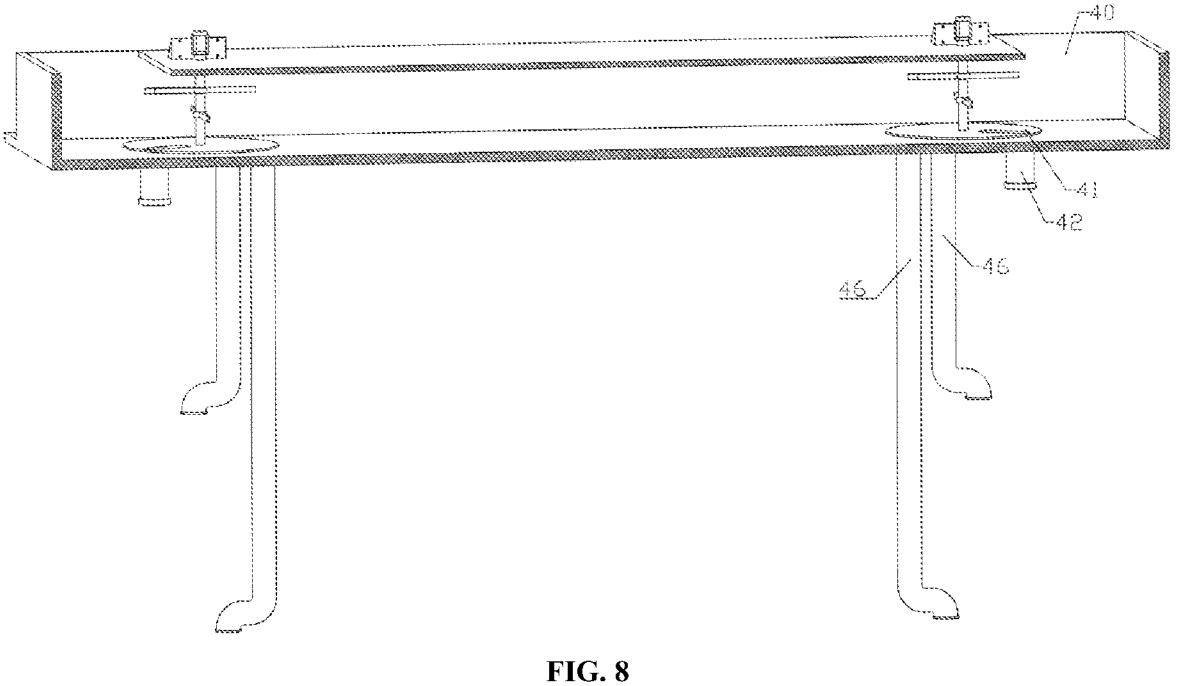
FIG. 8 is a schematic diagram of a storage box according to some embodiments of the present disclosure.
Figure 9:
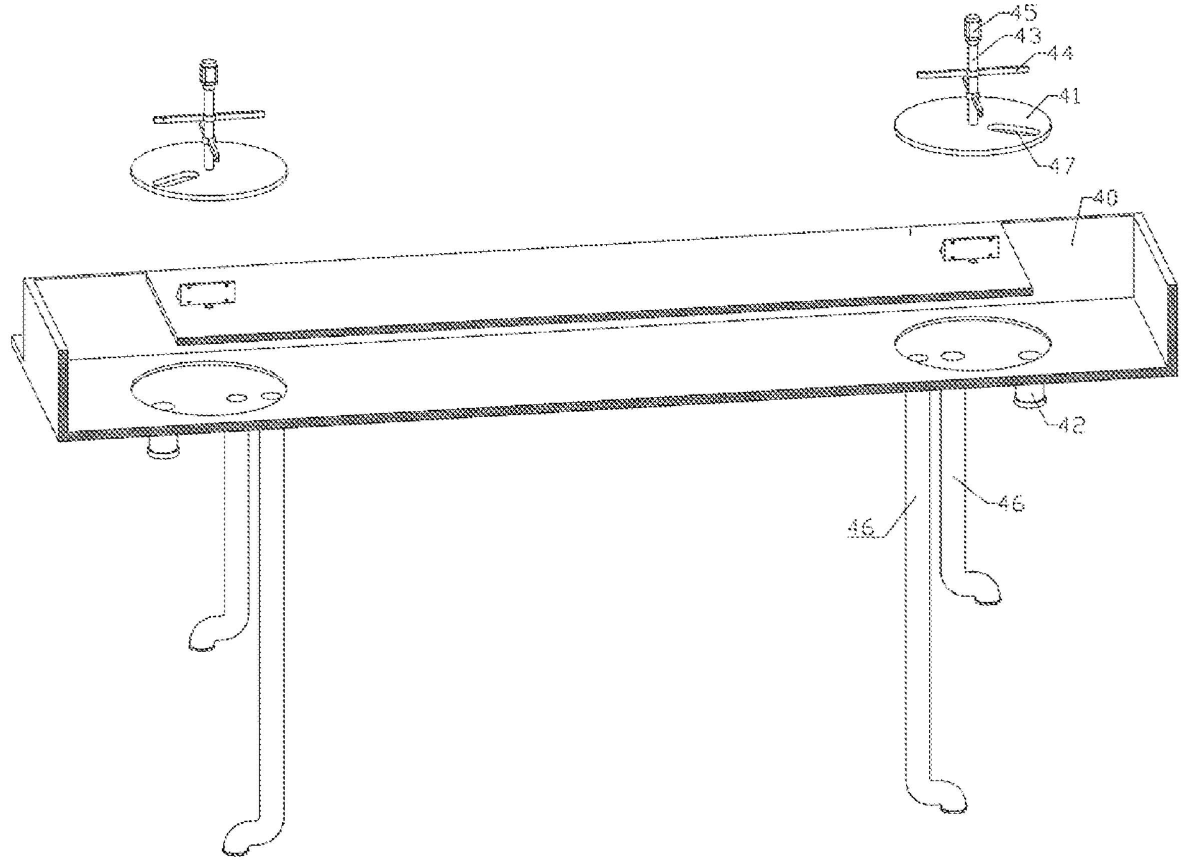
FIG. 9 is a schematic diagram of first turntables according to some embodiments of the present disclosure.

As shown in FIG. 8 to FIG. 9, the storage unit includes a storage box 40 fixedly connected to the top surface of the main box body 3; and first discharging assemblies in one-to-one correspondence to the anchor sealing units in an uppermost one of the anchor sealing chamber 4 are arranged in the storage box 40.

Each of the first discharging assemblies includes a first turntable 41; the first turntable 41 is rotatably mounted on an inner bottom surface of the storage box 40; a bottom surface of the storage box 40 is fixedly connected with several first pipelines 42; one end of each of the first pipelines 42 communicates with an interior of the storage box 40 and is located at a lower eccentric position of the first turntable 41; the other end of the first pipeline 42 passes through a top wall of the main box body 3 and directs to the second cylinders of the several anchor sealing units at the uppermost layer; a circle center position of a top surface of the first turntable 41 is fixedly connected with a fourth rotating shaft 43; an axis of the fourth rotating shaft 43 is perpendicular to the first turntable 41; an outer circumferential wall of the fourth rotating shaft 43 is fixedly connected with several agitation rods 44; a top surface of the storage box 40 is further provided with a fifth motor 45; and an output shaft of the fifth motor 45 extends into the storage box 40 and is fixedly connected with the fourth rotating shaft 43.

The bottom surface of the storage box 40 is further fixedly connected with several second pipelines 46; the second pipelines 46 has the same number as the anchor sealing units in each of lower ones of the anchor sealing chambers 4; one end of each of the second pipelines 46 communicates with an interior of the storage box 40 and is located at the lower eccentric position of any first turntable 41; the other end of each second pipeline 46 passes through the several separation plates and directs to the second cylinders of the several anchor sealing units at the lower ones of the anchor sealing chambers; and via holes 47 matched with the first pipelines 42 and the second pipelines 46 are formed in a top eccentric portion of the first turntable 41.

In this embodiment, when anchor sealing is required, a worker pours slurry into the storage box. The fifth motor rotates to drive the agitation rod to agitate the slurry. Meanwhile, the via holes periodically discharge the slurry through the first pipelines and the second pipelines into the anchor sealing units that are placed below to wait for slurry.

Figure 10:
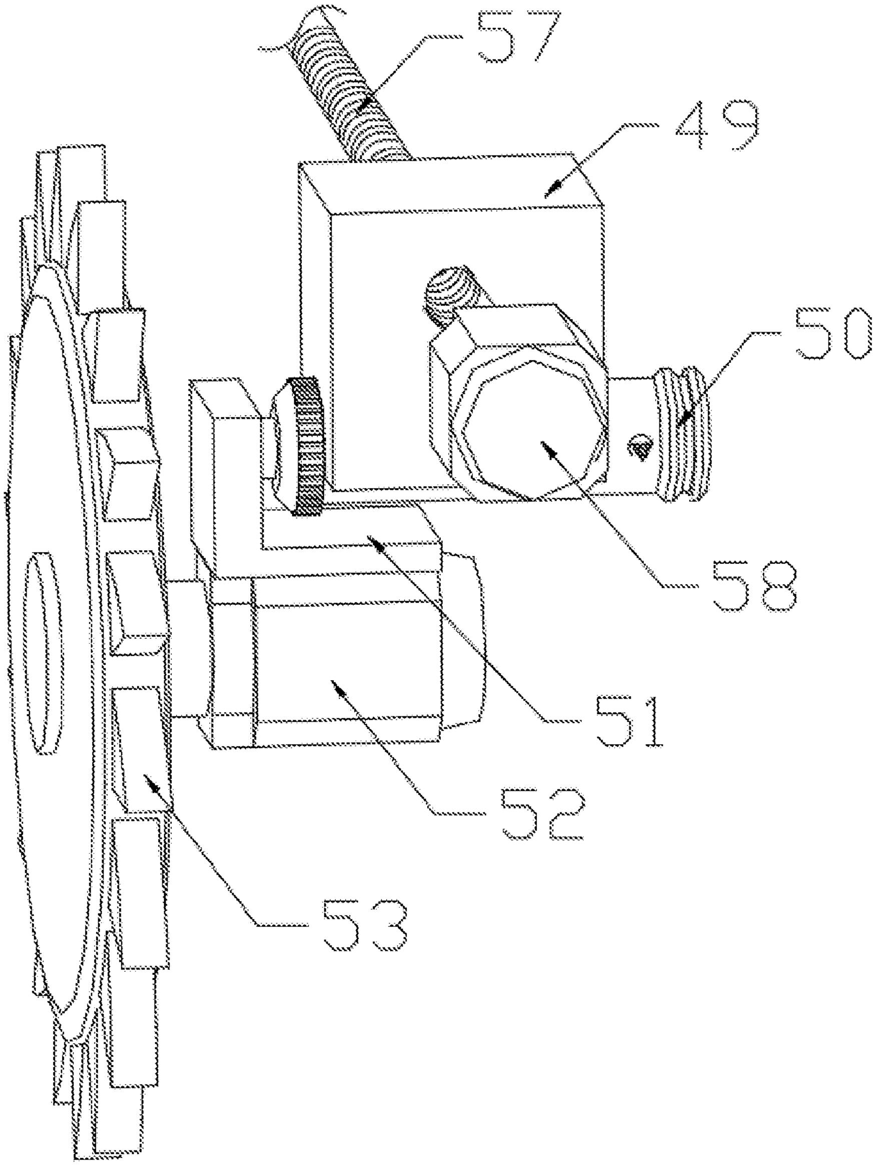
FIG. 10 is a schematic diagram of a saw blade according to some embodiments of the present disclosure.

As shown in FIG. 4 and FIG. 10, a third sliding chute 48 is further formed in an inner top wall of each of the anchor sealing chambers 4; a lengthwise direction of the third sliding chute 48 is perpendicular to the left and right side walls of the anchor sealing chamber 4 and is close to the front side of the anchor sealing chamber 4; a third threaded rod 57 and a seventh motor 58 are rotatably mounted in the third sliding chute 48; an axis of the third threaded rod 57 is parallel to the third sliding chute 48; an output shaft of the seventh motor 58 is fixedly connected to the third threaded rod 57; a third sliding block 49 is slidably mounted in the third sliding chute 48; the third sliding block 49 sleeves on the third threaded rod 57 and is in threaded connection with the third threaded rod 57; a bottom surface of the third sliding block 49 is provided with a second telescopic rod 50; a telescopic end of the second telescopic rod 50 directs to the front side of the anchor sealing chamber 4 and is fixedly connected with a mounting seat 51; the mounting seat 51 is provided with a sixth motor 52; and an output shaft of the sixth motor 52 directs to the front side of the anchor sealing chamber 4 and is fixedly connected with a saw blade 53.

In this embodiment, the seventh motor drives the third threaded rod, and the third threaded rod drives the third sliding block. The third sliding block drives the saw blade to move left and right. The second telescopic rod drives the saw blade to move front and back to change a reserved length for cutting a steel strand. The sixth motor drives the saw blade to rotate for cutting.

As shown in FIG. 3, a catching basket 54 is further mounted on the inner bottom surface of the anchor sealing chamber 4; and the catching basket 54 is located below the first telescopic rod 38 and is taken out from a rear side of the anchor sealing chamber 4.

In this embodiment, the catching basket is located below the first cylinder to catch the cut steel strands and the waste concrete residues are scraped down by the first disk.

As shown in FIG. 1, the bottom surface of the main box body 3 is fixedly connected with several T-shaped sliding blocks 55; and the top surface of the base 1 is fixedly connected with sliding rails 56 matched with the T-shaped sliding blocks 55.

In this embodiment, the main box body can slide on the base to select to abut against or get away from the box girder.

It should be finally noted that the above embodiments are only used to explain the technical solutions of the present disclosure and not intended to limit the technical solutions. Although the present disclosure has been described in detail with reference to the above embodiments, a person of ordinary skill in the art should understand that the specific implementations of the present disclosure can still be modified or equivalently replaced. Any modification or equivalent replacement without departing from the spirit and scope of the present disclosure shall fall within the protection scope of the claims of the present disclosure.

What is claimed is:

1. A removal-facilitated anchor sealing device for box girder construction, comprising a base (1), wherein wheels (2) are mounted below the base (1); a side in a forward direction of the wheels (2) is designated as a front side; a main box body (3) is arranged on a top surface of the base (1) in a manner of sliding back and forth; an interior of the main box body (3) is divided into a plurality of anchor sealing chambers (4) from bottom to top through separation plates;

for each of the anchor sealing chambers (4), a front side of each of the anchor sealing chambers (4) is opened; a plurality of anchor sealing units are arranged in each of the anchor sealing chambers (4) in sequence in a left-right direction; a corresponding one of spraying units are arranged below the anchor sealing units; working ends of the anchor sealing units and a working end of the corresponding one of the spraying units extend out of the anchor sealing chamber (4) from the front side of the anchor sealing chamber;

a storage unit for storing slurry is further arranged on a top surface of the main box body (3); and a discharging end of the storage unit communicates with the anchor sealing units respectively.

2. The removal-facilitated anchor sealing device for box girder construction according to claim 1, wherein each of the spraying units comprises a first box body (5); the first box body (5) is fixedly connected to an inner bottom surface of a corresponding one of the anchor sealing chambers (4) and is close to the front side of the corresponding one of the anchor sealing chambers (4); a front side wall of the first box body (5) is fixedly connected with a plurality of sprayer heads (6) that communicate with an interior of the first box body (5);

a top surface of the first box body (5) is rotatably provided with a first rotating shaft (7); an axis of the first rotating shaft (7) is perpendicular to left and right side walls of the corresponding one of the anchor sealing chambers (4); the first rotating shaft (7) is provided with a plurality of first threaded sections (8) and a plurality of second threaded sections (9) in sequence in an axial direction thereof; the first threaded sections (8) and the second threaded sections (9) are in one-to-one correspondence to the anchor sealing units: spiral directions of the first threaded sections (8) and spiral directions of the second threaded sections (9) are opposite; the top surface of the first box body (5) is further provided with a first motor (10); and an output shaft of the first motor (10) is fixedly connected with the first rotating shaft (7).

3. The removal-facilitated anchor sealing device for box girder construction according to claim 2, wherein each of the anchor sealing units comprises a first sliding chute (11) and a second sliding chute (12); the first sliding chute (11) and the second sliding chute (12) are both located on the top surface of the first box body (5) and are arranged in sequence from left to right; a lengthwise direction of the first sliding chute (11) and a lengthwise direction of the second sliding chute (12) are parallel to the first rotating shaft (7); the first rotating shaft (7) penetrates through the first sliding chute (11) and the second sliding chute (12) from left to right; one of the first threaded sections (8) is located in the first sliding chute (11), and one of the second threaded sections (9) is located in the second sliding chute (12);

a first sliding block (13) is mounted in the first sliding chute (11); the first sliding block (13) sleeves on the first threaded section (8) and is in threaded connection with the first threaded section (8); a second sliding block (14) is mounted in the second sliding chute (12); the second sliding block (14) sleeves on the second threaded section (9) and is in threaded connection with the second threaded section (9); a top surface of the first sliding block (13) is provided with a second motor (15); an output shaft of the second motor (15) is fixedly connected with a first gear (16); a top surface of the second sliding block (14) is provided with a third motor (17); an output shaft of the third motor (17) is fixedly connected with a second gear (18); and a pipeline assembly is rotatably mounted between the first sliding block (13) and the second sliding block (14).

4. The removal-facilitated anchor sealing device for box girder construction according to claim 3, wherein the pipeline assembly comprises a first cylinder formed by combining a left half cylinder (19) with a right half cylinder (20); an axis of the first cylinder is parallel to the left and right side walls of the anchor sealing chamber (4); an outer circumferential wall of the left half cylinder (19) is fixedly connected with a second left half cylinder (21), and an outer circumferential wall of the right half cylinder (20) is fixedly connected with a second right half cylinder (22); the second left half cylinder (21) and the second right half cylinder (22) are combined into a second cylinder; the second cylinder communicates with the first cylinder, and an axis of the second cylinder is perpendicular to the first cylinder; a combined surface, which faces towards the right half cylinder (20), of the left half cylinder (19) is fixedly connected with a clamping block (23); a combined surface, which faces towards the left half cylinder (19), of the right half cylinder (20) is fixedly connected with a clamping slot (24); the clamping block (23) is matched with the clamping slot (24); the outer circumferential wall of the left half cylinder (19) is fixedly connected with a second rotating shaft (25); an axis of the second rotating shaft (25) is perpendicular to the left and right side walls of the anchor sealing chamber (4); the second rotating shaft (25) is rotatably mounted on the first sliding block (13) and is fixedly connected with a third gear (26); the third gear (26) is engaged with the first gear (16); the outer circumferential wall of the right half cylinder (20) is fixedly connected with a third rotating shaft (27); the third rotating shaft (27) is coaxial with the second rotating shaft (25); the third rotating shaft (27) is rotatably mounted on the second sliding block (14) and is fixedly connected with a fourth gear (28); the fourth gear (28) is engaged with the second gear (18);

a ring slot (29) is formed in an outer circumferential wall of one end of the first cylinder; a combinable left half ring (30) and a combinable right half ring (31) are rotatably mounted in the ring slot (29); an end surface of one end of the left half ring (30) which is away from the first cylinder and an end surface of one end of the right half ring (31) which is away from the first cylinder are fixedly connected with a plurality of metal bosses (32); an end surface of one end of the left half ring (30) which is close to the first cylinder and an end surface of one end of the right half ring (31) which is close to the first cylinder are fixedly connected with a combinable left half tooth ring (33) and a combinable right half tooth ring (34) respectively; a fourth motor (35) is mounted on the outer circumferential wall of the left half cylinder (19); an output shaft of the fourth motor (35) is fixedly connected with a fifth gear (36); the fifth gear (36) is engaged with the left half tooth ring (33) and the right half tooth ring (34);

the pipeline assembly further comprises a first telescopic rod (38); a rear inner wall of the anchor sealing chamber (4) is fixedly connected with a mounting platform (37); the first telescopic rod (38) is mounted on the mounting platform (37); expansion and contraction directions of the first telescopic rod (38) are perpendicular to the rear inner wall of the anchor sealing chamber (4); and a telescopic end of the first telescopic rod (38) directs to the first cylinder and is fixedly connected with a first disk (39).

5. The removal-facilitated anchor sealing device for box girder construction according to claim 4, wherein the storage unit comprises a storage box (40) fixedly connected to the top surface of the main box body (3); first discharging assemblies in one-to-one correspondence to the anchor sealing units in an uppermost one of the anchor sealing chambers (4) are arranged in the storage box (40));

each of the first discharging assemblies comprises a first turntable (41); the first turntable (41) is rotatably mounted on an inner bottom surface of the storage box (40); a bottom surface of the storage box (40) is fixedly connected with a plurality of first pipelines (42); one end of each of the first pipelines (42) communicates with an interior of the storage box (40) and the one end of a corresponding one of the first pipelines is located at a lower eccentric position of the first turntable (41); an other end of each of the first pipelines (42) passes through a top wall of the main box body (3) and directs to the second cylinder of each of the plurality of anchor sealing units at the uppermost one of the anchor sealing chambers; a circle center position of a top surface of the first turntable (41) is fixedly connected with a fourth rotating shaft (43); an axis of the fourth rotating shaft (43) is perpendicular to the first turntable (41); an outer circumferential wall of the fourth rotating shaft (43) is fixedly connected with a plurality of agitation rods (44); a top surface of the storage box (40) is further provided with a fifth motor (45); an output shaft of the fifth motor (45) extends into the storage box (40) and is fixedly connected with the fourth rotating shaft (43);

the bottom surface of the storage box (40) is further fixedly connected with a plurality of second pipelines (46); the second pipelines (46) has a same number as the anchor sealing units in each of lower ones of the anchor sealing chambers (4); one end of each of the second pipelines (46) communicates with an interior of the storage box (40) and the one end of a corresponding one of the second pipelines is located at the lower eccentric position of the first turntable (41); an other end of each of the second pipelines (46) passes through the plurality of separation plates and directs to the second cylinder of each of the plurality of anchor sealing units at the lower ones of the anchor sealing chambers; and a via hole (47) matched with a corresponding one of the first pipelines (42) and a corresponding one of the second pipelines (46) is formed in a top eccentric portion of the first turntable (41).

6. The removal-facilitated anchor sealing device for box girder construction according to claim 4, wherein a catching basket (54) is further mounted on an inner bottom surface of the anchor sealing chamber (4); and the catching basket (54) is located below the first telescopic rod (38) and is taken out from a rear side of the anchor sealing chamber (4).

7. The removal-facilitated anchor sealing device for box girder construction according to claim 1, wherein a third sliding chute (48) is further formed in an inner top wall of each of the anchor sealing chambers (4); a lengthwise direction of the third sliding chute (48) is perpendicular to the left and right side walls of the anchor sealing chamber (4) and is close to the front side of the anchor sealing chamber (4); a third threaded rod (57) and a seventh motor (58) are rotatably mounted in the third sliding chute (48); an axis of the third threaded rod (57) is parallel to the third sliding chute (48); an output shaft of the seventh motor (58) is fixedly connected to the third threaded rod (57); a third sliding block (49) is slidably mounted in the third sliding chute (48); the third sliding block (49) sleeves on the third threaded rod (57) and is in threaded connection with the third threaded rod (57); a bottom surface of the third sliding block (49) is provided with a second telescopic rod (50); a telescopic end of the second telescopic rod (50)) directs to the front side of the anchor sealing chamber (4) and is fixedly connected with a mounting seat (51); the mounting seat (51) is provided with a sixth motor (52); and an output shaft of the sixth motor (52) directs to the front side of the anchor sealing chamber (4) and is fixedly connected with a saw blade (53).

8. The removal-facilitated anchor sealing device for box girder construction according to claim 1, wherein a bottom surface of the main box body (3) is fixedly connected with a plurality of T-shaped sliding blocks (55); and the top surface of the base (1) is fixedly connected with sliding rails (56) matched with the T-shaped sliding blocks (55).

* * * * *